United States Patent
Zhang et al.

(10) Patent No.: US 12,154,699 B2
(45) Date of Patent: Nov. 26, 2024

(54) PREPARATION METHOD OF A FLEXIBLE TRANSPARENT RADIATION SHIELDING FILM BASED ON BISMUTH COMPOUNDS AND ITS APPLICATION

(71) Applicant: University of Jinan, Jinan (CN)

(72) Inventors: Yuhai Zhang, Jinan (CN); Xiangzhou Zhang, Jinan (CN); Zhaolai Chen, Jinan (CN)

(73) Assignee: University of Jinan (CN)

( * ) Notice: Subject to any disclaimer, the term of this patent is extended or adjusted under 35 U.S.C. 154(b) by 118 days.

(21) Appl. No.: 18/125,126

(22) Filed: Mar. 23, 2023

(65) Prior Publication Data

US 2023/0326620 A1    Oct. 12, 2023

(30) Foreign Application Priority Data

Mar. 24, 2022    (CN) .......................... 202210298320.4

(51) Int. Cl.
  *G21F 1/12*    (2006.01)
  *G21F 1/10*    (2006.01)
(52) U.S. Cl.
  CPC . *G21F 1/12* (2013.01); *G21F 1/10* (2013.01)

(58) Field of Classification Search
  None
  See application file for complete search history.

(56) References Cited

PUBLICATIONS

Bukhvalova et al. Bismuth and thorium fluorides as efficient X-ray radiation shielding materials. Radiation Physics and Chemistry 182, 109388 (Year: 2021).*

* cited by examiner

*Primary Examiner* — Tanisha Diggs

(57) ABSTRACT

A preparation method of flexible transparent radiation shielding film based on bismuth compounds and its application are provided, in which bismuth compound nanoparticles, polyvinyl alcohol and trace glycerol are mixed to produce a flexible transparent radiation shielding film. The invention disperses the nanoparticles in water to form a stable dispersion, which ensures the homogeneity of the sol obtained by mixing the nanoparticles with polyvinyl alcohol. This invention avoids the decrease in transparency of the composite film as induced by agglomeration of the nanoparticles, achieving a light transmission of over 70% in the visible wavelength band (400-800 nm). With the aid of trace-mount glycerol, the film features long-term stability and flexibility. Importantly, the lead-free film shows a high shielding ability from the medical X-ray band (10-100 keV), which is comparable to Cu foil of identical thickness.

4 Claims, 1 Drawing Sheet

PREPARATION METHOD OF A FLEXIBLE TRANSPARENT RADIATION SHIELDING FILM BASED ON BISMUTH COMPOUNDS AND ITS APPLICATION

CROSS REFERENCE TO THE RELATED APPLICATIONS

This application is based upon and claims priority to Chinese Patent Application No. 202210298320.4, filed on Mar. 24, 2022, the entire contents of which are incorporated herein by reference.

TECHNICAL FIELD

The present invention relates to the technical field of optoelectronic and medical devices and ceramics, and in particular to a preparation method of flexible transparent radiation shielding film based on bismuth compounds and its application.

BACKGROUND

As an emerging field, the application of ionizing radiation has contributed significantly to economic development and social progress, particularly in the area of medical radiation exposure, which has resulted in a large number of diagnostic and therapeutic techniques. At the same time, ionizing radiation poses a major threat to human health. In a typical interventional surgery, the surgeons are unavoidably exposed to continuous X-ray radiation, while clear sight was essential to the operation. Therefore, radiation shielding is crucial to doctors in these scenarios. Usually, material shielding is one of the most important means of radiation shielding, i.e. the installation of a suitable shield between the radiation source and the object to be irradiated. However, for X-rays and gamma rays, the best results are achieved with substances of high atomic number.

Traditional radiation shielding materials are divided into two main categories, one is metal-based shielding materials, represented by lead sheets, which have a good shielding capacity, but are less portable and suitable for use in fixed situations. The other category is heavy metal composites, mainly lead-based composites, such as lead rubber and lead glass, which are partially flexible and transparent, but still have major shortcomings. Firstly, lead is biotoxic, less stable and volatile, affecting the nervous system as well as its biological tissues and organs, especially for children; secondly, traditional radiation shielding materials have a single performance, making it difficult to achieve a unification of multiple properties such as flexibility, transparency and lightness, limiting their scope of application.

SUMMARY

The present invention provides a preparation method of flexible transparent radiation shielding film based on bismuth compounds and its application to solve the above problems of the prior art.
The Scheme of the Present Invention is:
The preparation method of flexible transparent radiation shielding film based on bismuth compounds includes the following steps:
1) Providing a reactant bismuth source $Bi(NO_3)_3 \cdot 5H_2O$ with a reactant fluorine source $NH_4F$ in a molar ratio of 1:3, and a reaction solvent is ethylene glycol;
2) Dissolving the reactant bismuth source $Bi(NO_3)_3 \cdot 5H_2O$ and the reactant fluorine source $NH_4F$ weighed in step 1) in ethylene glycol, respectively, and stirring continuously until resulting the solutions are clear;
3) Mixing the ethylene glycol solution containing the bismuth source $Bi(NO_3)_3 \cdot 5H_2O$ with the ethylene glycol solution containing the fluorine source $NH_4F$ under stirring, and the reaction lasts for 1 minute;
4) Separating the reaction product of step 3) by centrifugation to obtain a precipitate, then dispersing the precipitate in deionized water to obtain a nanoparticle dispersion;
5) Mixing the nanoparticle dispersion of step 4) with the aqueous polyvinyl alcohol solution in different mass ratios, adding 0.1% by volume glycerol, stirring and mixing uniformly, resulting in a mixed hydrosol;
6) Taking 1-100% of the volume of the mixed hydrosol in step 5) and dropping it on a substrate by the film-forming method, then putting the resulting product into an oven and drying at 30-100° C. to get a flexible and transparent radiation shielding film.

As a preferred technical solution, the size of the nuclear nanocrystal of the nanoparticle dispersion in step 4) is distributed in the range of 10-100 nm.

The bismuth source is one of the bismuth compounds, rare earth compounds, and other heavy metal compounds; the fluorine source is one of ammonium fluoride, hydrofluoric acid, sodium fluoride and other fluorides.

As a preferred technical embodiment, under rapid stirring in step 3), slowly pouring the ethylene glycol solution of bismuth nitrate into the ethylene glycol solution of ammonium fluoride;

As a preferred technical embodiment, the mass of the water-soluble core-shell nanocrystals in step 6) accounts for more than 60% of the total mass of the flexible and transparent radiation shielding film.

As a preferred technical embodiment, the film-forming method in step 6) includes one of drip coating, spin coating and printing.

As a preferred technical embodiment, the substrate material in step 6) includes one of polypropylene, glass, PTFE, and transparent ceramic.

The invention also discloses the applications for the flexible and transparent radiation shielding film based on bismuth compounds in the fields of medical, optoelectronic devices and ceramics.

The present invention adopts the above technical solution in the preparation method of flexible transparent radiation shielding film based on bismuth compounds and its application, including the following steps: 1) Providing the reactant bismuth source $Bi(NO_3)_3 \cdot 5H_2O$ with the reactant fluorine source $NH_4F$ in a molar ratio of 1:3, and a reaction solvent is ethylene glycol; 2) Dissolving the reactant bismuth source $Bi(NO_3)_3 \cdot 5H_2O$ and fluorine source $NH_4F$ weighed in step 1) in ethylene glycol, respectively, and stirring continuously until resulting solutions are clear; 3) Mixing the ethylene glycol solution containing the bismuth source $Bi(NO_3)_3 \cdot 5H_2O$ with the ethylene glycol solution containing the fluorine source $NH_4F$ under stirring, and the reaction lasts for 1 minute; 4) Separating the reaction product of step 3) by centrifugation to obtain a precipitate, then dispersing the precipitate in deionized water to obtain a nanoparticle dispersion; 5) Mixing the nanoparticle dispersion of step 4) with the aqueous polyvinyl alcohol solution in different mass ratios, adding 0.1% by volume glycerol, stirring and mixing uniformly, resulting in a mixed hydrosol; 6) Taking 1-100% of the volume of the mixed hydrosol in step 5) and dropping it on a substrate by the film-forming method, then putting the resulting product into an oven and drying at 30-100° C. to get a flexible and transparent radiation shielding film.

Advantages of the Present Invention

By dispersing the nanoparticles in water to form a stable dispersion, the invention ensures the homogeneity of the sol obtained by mixing the nanoparticles with polyvinyl alcohol, and avoids the decrease in transparency of the composite film due to agglomeration of the nanoparticles resulting in a high transmittance more than 70% in the visible region (400-800 nm); The stability of the flexible radiation shielding film can maintain in a long term under the action of trace glycerol.

The invention achieves an effective absorption of X-rays and a reduction in the transmission rate of X-rays while maintaining the high transparency of the flexible transparent radiation shielding film. It also achieves protection against radiation-sensitive components, especially protecting personnel from radiation in nuclear and industrial facilities, laboratories and medical centers.

DETAILED DESCRIPTION OF THE EMBODIMENTS

Figure 1:
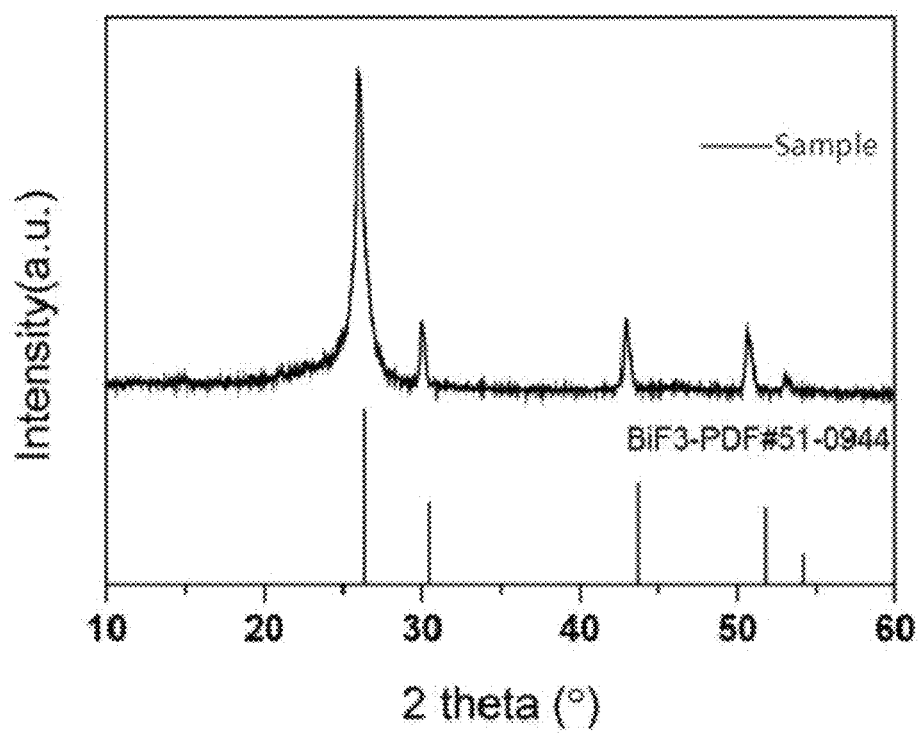
FIG. 1: XRD of the nanocrystals of the present invention and the flexible transparent radiation shielding film.
Figure 2:
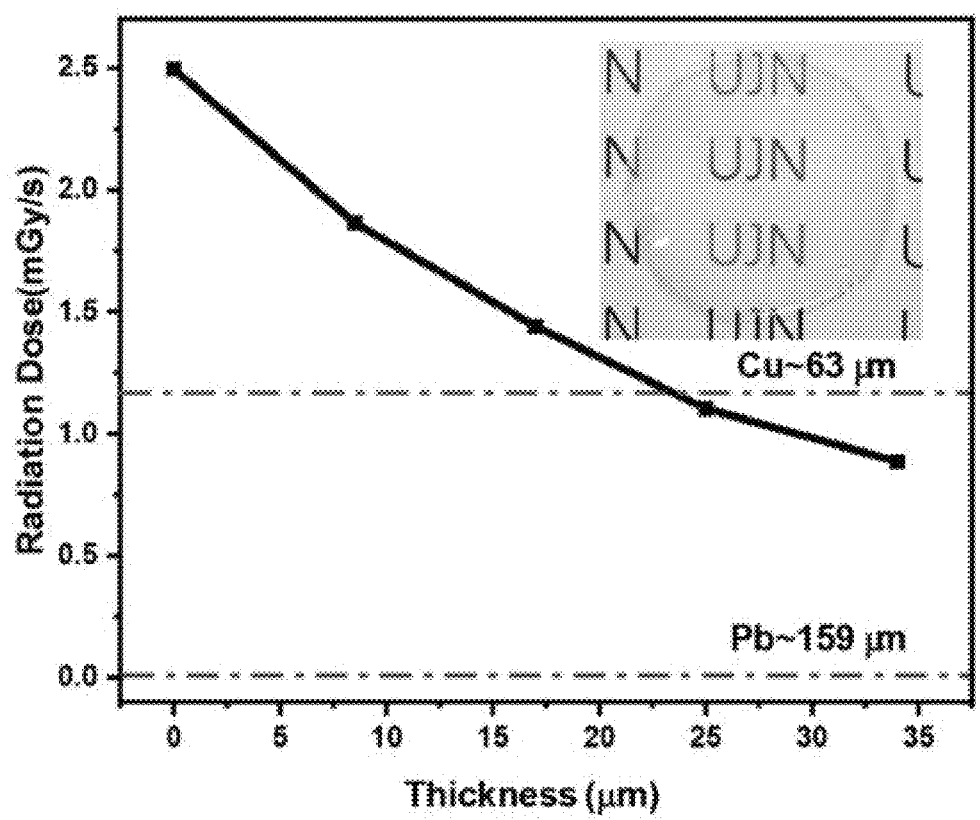
FIG. 2: Comparison of the protective effect of the flexible transparent radiation shielding film of the invention with copper and lead sheets and transparency presentations. The X-ray shielding ability of 35-μm film was better than 63-μm Cu foil, but weaker than 159-μm Pb sheet.

To make up for the shortcomings of conventional protective materials, the present invention provides a preparation method of flexible transparent radiation shielding film based on bismuth compounds and its application to solve the problems in the background art described above.

The preparation method of flexible transparent radiation shielding film based on bismuth compounds, including the following steps:
1) Providing a reactant bismuth source $Bi(NO_3)_3 \cdot 5H_2O$ with a reactant fluorine source NHF in a molar ratio of 1:3, and a reaction solvent is ethylene glycol;
2) Dissolving the reactant bismuth source $Bi(NO_3)_3 \cdot 5H_2O$ and the reactant fluorine source $NH_4F$ weighed in step 1) in ethylene glycol, respectively, and stirring continuously until resulting the solutions are clear;
3) Mixing the ethylene glycol solution containing the bismuth source $Bi(NO_3)_3 \cdot 5H_2O$ with the ethylene glycol solution containing the fluorine source $NH_4F$ under stirring, and the reaction lasts for 1 minute;
4) Separating the reaction product of step 3) by centrifugation to obtain a precipitate, then dispersing the precipitate in deionized water to obtain a nanoparticle dispersion;
5) Mixing the nanoparticle dispersion of step 4) with the aqueous polyvinyl alcohol solution in different mass ratios, adding 0.1% by volume glycerol, stirring and mixing uniformly, resulting in a mixed hydrosol;
6) Taking 1-100% of the volume of the mixed hydrosol in step 5) and dropping it on a substrate by the film-forming method, then putting the resulting product into an oven and drying at 30-100° C. to get a flexible and transparent radiation shielding film.

The size of the nuclear nanocrystal of the nanoparticle dispersion in step 4) is distributed in the range of 10-100 nm.

The bismuth source is one of the bismuth compounds, rare earth compounds, and other heavy metal compounds; the fluorine source is one of ammonium fluoride, hydrofluoric acid, sodium fluoride and other fluorides.

Under rapid stirring in step 3), slowly pouring the ethylene glycol solution of bismuth nitrate into the ethylene glycol solution of ammonium fluoride;

The mass of the water-soluble core-shell nanocrystals in step 6) accounts for more than 60% of the total mass of the flexible and transparent radiation shielding film.

The film-forming method in step 6) includes one of drip coating, spin coating and printing.

The substrate material in step 6) includes one of polypropylene, glass, PTFE, and transparent ceramic.

The invention also discloses the applications for the flexible and transparent radiation shielding film based on bismuth compounds in the fields of medical, optoelectronic devices and ceramics.

To make the technical means, the creative features, the purpose, and efficacy achieved by the present invention easy to understand, the invention is further elaborated below in conjunction with specific embodiments.

Example 1

1) Providing the reactant bismuth source $Bi(NO_3)_3 \cdot 5H_2O$ with the reactant fluorine source $NH_4F$ in a molar ratio of 1:3, and a reaction solvent is ethylene glycol;
2) Dissolving the reactant bismuth source $Bi(NO_3)_3 \cdot 5H_2O$ and the reactant fluorine source $NH_4F$ weighed in step 1) in ethylene glycol, respectively, and stirring continuously until resulting the solutions are clear;
3) Mixing the ethylene glycol solution containing the bismuth source $Bi(NO_3)_3 \cdot 5H_2O$ with the ethylene glycol solution containing the fluorine source $NH_4F$ under stirring, and the reaction lasts for 1 minute;
4) Separating the reaction product of step 3) by centrifugation to obtain a precipitate, then dispersing the precipitate in deionized water to obtain a nanoparticle dispersion;
5) Mixing the nanoparticle dispersion of step 4) with the aqueous polyvinyl alcohol solution in different mass ratios, adding 0.1% by volume glycerol, stirring and mixing uniformly, resulting in a mixed hydrosol;
6) Taking 1-100% of the volume of the mixed hydrosol in step 5) and dropping it on a substrate by the film-forming method, then putting the resulting product into an oven and drying at 30-100° C. to get a flexible and transparent radiation shielding film.

The size of the nuclear nanocrystal of the nanoparticle dispersion in step 4) is distributed in the range of 10-100 nm.

The bismuth source is one of the bismuth compounds, rare earth compounds, and other heavy metal compounds; the fluorine source is one of ammonium fluoride, hydrofluoric acid, sodium fluoride and other fluorides.

Under rapid stirring in step 3), slowly pouring the ethylene glycol solution of bismuth nitrate into the ethylene glycol solution of ammonium fluoride;

The mass of the water-soluble core-shell nanocrystals in step 6) accounts for more than 60% of the total mass of the flexible and transparent radiation shielding film.

The film-forming method in step 6) includes one of drip coating, spin coating and printing.

The substrate material in step 6) includes one of polypropylene, glass, PTFE, and transparent ceramic.

Example 2

1) Providing the reactant bismuth source $Bi(NO_3)_3 \cdot 5H_2O$ with the reactant fluorine source $NH_4F$ in a molar ratio of 1:3, and a reaction solvent is ethylene glycol;

2) Dissolving the reactant bismuth source $Bi(NO_3)_3 \cdot 5H_2O$ and the reactant fluorine source $NH_4F$ weighed in step 1) in ethylene glycol, respectively, and stirring continuously until resulting the solutions are clear;

3) Mixing the ethylene glycol solution containing the bismuth source $Bi(NO_3)_3 \cdot 5H_2O$ with the ethylene glycol solution containing the fluorine source $NH_4F$ under stirring, and the reaction lasts for 1 minute;

4) Separating the reaction product of step 3) by centrifugation to obtain a precipitate, then dispersing the precipitate in deionized water to obtain a nanoparticle dispersion;

5) Mixing the nanoparticle dispersion of step 4) with the aqueous polyvinyl alcohol solution in different mass ratios, adding 0.1% by volume glycerol, stirring and mixing uniformly, resulting in a mixed hydrosol;

6) Taking 1-100% of the volume of the mixed hydrosol in step 5) and dropping it on a substrate by the film-forming method, then putting the resulting product into an oven and drying at 30-100° C. to get a flexible and transparent radiation shielding film.

The size of the nuclear nanocrystal of the nanoparticle dispersion in step 4) is distributed in the range of 10-100 nm.

Under rapid stirring in step 3), slowly pouring the ethylene glycol solution of bismuth nitrate into the ethylene glycol solution of ammonium fluoride.

The mass of the water-soluble core-shell nanocrystals in step 6) accounts for 0.1%-99.9% of the total mass of the flexible and transparent radiation shielding film.

The film-forming method in step 6) includes one of drip coating, spin coating and printing.

In step 1), the reactant bismuth source is bismuth nitrate, and the fluorine source is ammonium fluoride.

In step 6), the substrate material is polypropylene.

The above shows and describes the basic principle of the present invention, the main features and the advantages of the present invention. It should be understood by those skilled in the art that the present invention is not limited by the above-mentioned embodiments, that what is described in the above embodiments and in the specification only illustrates the principles of the present invention, and that there will be various variations and improvements to the present invention without departing from the spirit and scope of the present invention, all of which fall within the scope of the present invention for which protection is claimed. The scope of protection claimed for the present invention is defined by the appended claims and their equivalents.

What is claimed is:

1. A preparation method of a flexible transparent radiation shielding film based on bismuth based fluoride, the method comprising the following steps:
   1) Providing a bismuth source comprising $Bi(NO_3)_3 \cdot 2H_2O$, a fluorine source comprising $NH_4F$ in a molar ratio of 1:3, and ethylene glycol as a reaction solvent;
   2) Dissolving the bismuth source and the fluorine source in step 1) each in ethylene glycol, and stirring continuously until each resulting solution is clear;
   3) Mixing a resulting ethylene glycol solution containing the bismuth source with a resulting ethylene glycol solution containing the fluorine source under stirring, and allowing to react for 1 minute to obtain a resulting reaction product;
   4) Separating the resulting reaction product of step 3) by centrifugation to obtain a precipitate, then dispersing the precipitate in deionized water to obtain a nanoparticle dispersion liquid comprising nanocrystals;
   5) Mixing the nanoparticle dispersion liquid of step 4) with an aqueous polyvinyl alcohol solution, adding 0.1% by volume of glycerol, stirring and mixing uniformly to obtain a mixed hydrosol;
   6) Taking and spreading 1-100% of the volume of the mixed hydrosol in step 5) on a substrate by a film-forming method, then putting a resulting product into an oven and drying at 30-100° C. to form a flexible transparent radiation shielding film; the film-forming method is one of dripping, spinning, coating and printing.

2. The preparation method of the flexible transparent radiation shielding film based on the bismuth based fluoride according to claim 1, wherein a size of a nuclear nanocrystal of the nanoparticle dispersion liquid in step 4) is distributed in a range of 10-100 nm.

3. The preparation method of the flexible transparent radiation shielding film based on the bismuth based fluoride according to claim 1, wherein a material of the substrate in step 6) comprises one of polypropylene, glass, polytetrafluoroethylene, or a transparent ceramic.

4. The preparation method of the flexible transparent radiation shielding film based on bismuth based fluoride according to claim 1, wherein the flexible transparent radiation shielding film is used in the fields of medical, optoelectronic, and ceramics.

* * * * *